United States Patent
Chalom et al.

(10) Patent No.: US 9,826,149 B2
(45) Date of Patent: Nov. 21, 2017

(54) MACHINE LEARNING OF REAL-TIME IMAGE CAPTURE PARAMETERS

(71) Applicant: Intel Corporation, Santa Clara, CA (US)

(72) Inventors: Edmond Chalom, Petach Tikvah (IL); Dmitry Rudoy, Haifa (IL); Noam Levy, Karmiel (IL); Harish Essaky Sankaran, Tampere (FI); Jarno Nikkanen, Kangasala (FI); Joni-Matti Maatta, Tampere (FI); German Voronov, Holon (IL)

(73) Assignee: Intel Corporation, Santa Clara, CA (US)

( * ) Notice: Subject to any disclaimer, the term of this patent is extended or adjusted under 35 U.S.C. 154(b) by 55 days.

(21) Appl. No.: 14/670,642

(22) Filed: Mar. 27, 2015

(65) Prior Publication Data

US 2016/0284095 A1 Sep. 29, 2016

(51) Int. Cl.
*G06K 9/20* (2006.01)
*G06K 9/36* (2006.01)
(Continued)

(52) U.S. Cl.
CPC ..... *H04N 5/23229* (2013.01); *G06K 9/00684* (2013.01); *G06T 7/11* (2017.01);
(Continued)

(58) Field of Classification Search
None
See application file for complete search history.

(56) References Cited

U.S. PATENT DOCUMENTS 6,301,440 B1 * 10/2001 Bolle ................. 348/229.1
2003/0052978 A1 * 3/2003 Kehtarnavaz ........ H04N 9/735
348/223.1

(Continued)

FOREIGN PATENT DOCUMENTS

JP 2012182572 A 9/2012
KR 20140039928 4/2014
(Continued)

OTHER PUBLICATIONS

MIT, "MIT-Adobe FiveK Dataset," retrieved from <groups.csail.mit.edu/graphics/fiveK_dataset/> on Feb. 25, 2015, 272 pages.
(Continued)

*Primary Examiner* — Brian P Werner
(74) *Attorney, Agent, or Firm* — Jordan IP Law, LLC

(57) ABSTRACT

Methods, apparatuses and systems may provide for operating a machine learning device by obtaining training image data, conducting an offline prediction analysis of the training image data with respect to one or more real-time parameters of an image capture device, and generating one or more parameter detection models based on the offline prediction analysis. Additionally, methods, apparatuses and systems may provide for operating the image capture device by obtaining a candidate image associated with the image capture device, determining that the candidate image corresponds to a particular type of scene represented in a parameter prediction model, and adjusting one or more real-time parameters of the image capture device based at least in part on one or more parameter values associated with the particular type of scene.

24 Claims, 6 Drawing Sheets

(51) Int. Cl.
*H04N 5/232* (2006.01)
*G06T 7/11* (2017.01)
*G06K 9/00* (2006.01)

(52) U.S. Cl.
CPC ............... *H04N 5/23222* (2013.01); *G06T 2207/10004* (2013.01); *G06T 2207/20084* (2013.01)

(56) References Cited

U.S. PATENT DOCUMENTS

| | | | |
|---|---|---|---|
| 2004/0120572 A1* | 6/2004 | Luo | G06F 17/30247 382/159 |
| 2007/0025722 A1 | 2/2007 | Matsugu et al. | |
| 2009/0179998 A1 | 7/2009 | Steinberg et al. | |
| 2012/0148094 A1 | 6/2012 | Huang et al. | |
| 2014/0037135 A1 | 2/2014 | Kutliroff et al. | |

FOREIGN PATENT DOCUMENTS

| | | |
|---|---|---|
| TW | 201225004 A | 6/2012 |
| TW | 201308251 A | 2/2013 |

OTHER PUBLICATIONS

Robnik-Sikonja, M. et al., "An Adaptation of relief for Attribute Estimation in Regression," In Proceeding ICML '97 Proceedings of the Fourteenth International Conference on Machine Learning, 1997, 9 pages.

Weka, "Class ReliefFAttributeEval," retrieved from <weka.sourceforge.net/doc.dev/weka/attributeSelection/ReliefFAttributeEval.html> on Feb. 25, 2015, 11 pages.

International Search Report and Written Opinion for International Patent Application No. PCT/US2016/019988, dated on Jul. 7, 2016, 14 pages.

* cited by examiner

MACHINE LEARNING OF REAL-TIME IMAGE CAPTURE PARAMETERS

BACKGROUND

Cameras may use an automatic exposure mode to determine the correct exposure for images without end user (e.g., photographer) input. More particularly, conventional automatic exposure solutions may attempt to determine exposure parameter values such as exposure time, analog gain, digital gain, etc., that enable the final image to meet a brightness target. The brightness target may be fixed by the manufacturer of the camera due to timing constraints and processing limits associated with real-time camera operation. Different types of scenes, however, may not have the same optimal brightness level from a visual standpoint. Thus, a fixed brightness target for one type of scene may render suboptimal results for another type of scene. On the other hand, hardcoding different brightness targets into the camera for different types of scenes may involve time consuming and costly code authoring, compilation and manufacturing activities.

BRIEF DESCRIPTION OF THE DRAWINGS

The various advantages of the embodiments will become apparent to one skilled in the art by reading the following specification and appended claims, and by referencing the following drawings, in which:

DETAILED DESCRIPTION

Figure 1A:
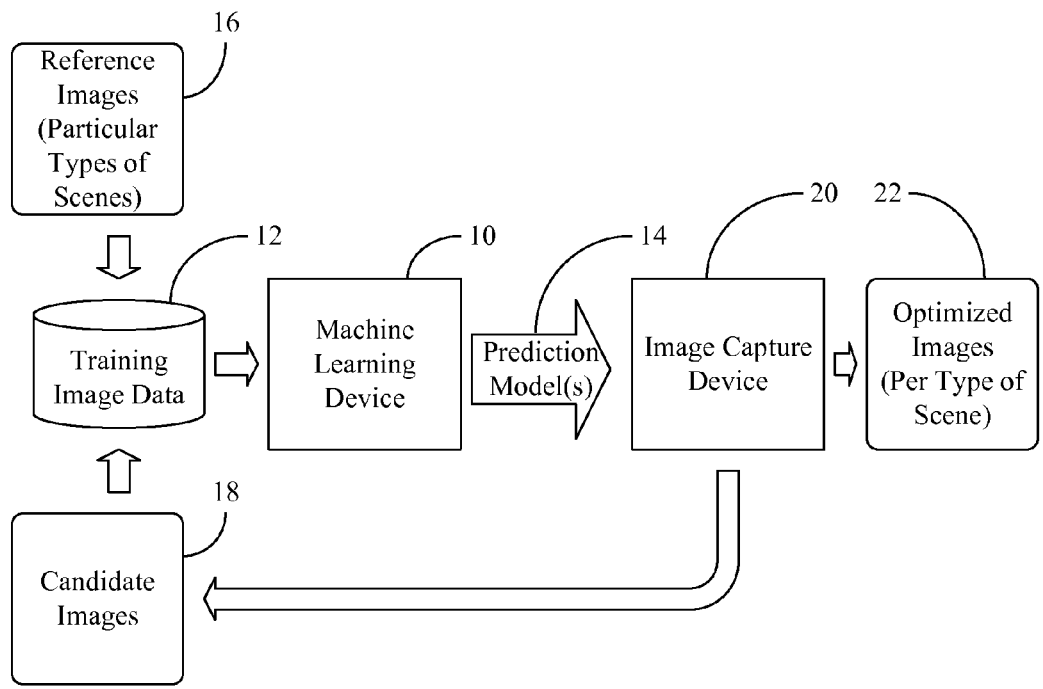
FIG. 1A is a block diagram of an example of a machine learning approach to determining real-time image capture parameters according to an embodiment.

FIG. 1A shows a machine learning approach to determining real-time image capture parameters. In the illustrated example, a machine learning device 10 (e.g., server, desktop computer, notebook computer, tablet computer, convertible tablet, etc.) uses training image data 12 to generate a prediction model 14 that represents various types of scenes contained in the training image data 12. More particularly, the training image data 12 may include reference images 16 of particular types of scenes as well as candidate images 18 associated with an image capture device 20 (e.g., digital camera, smart phone, convertible tablet, tablet computer, etc.). The illustrated reference images 16 have optimal brightness, focus and/or white balance characteristics, whereas the candidate images 18 may contain raw images generated by the image capture device without enhancements with regard to brightness, focus, white balance, and so forth. As will be discussed in greater detail, the machine learning device 10 may conduct an offline prediction analysis of the training image data 12 with respect to one or more real-time parameters (e.g., exposure control brightness parameters, tone mapping brightness parameters, focus parameters, white balance parameters, etc.), wherein the illustrated prediction model 14 is generated based on the offline prediction analysis.

Moreover, the illustrated image capture device 20 detects when subsequent images correspond to particular types of scenes reflected in the prediction model 14 and adjusts the real-time parameters (e.g., exposure control brightness parameters, tone mapping brightness parameters, focus parameters, white balance parameters, etc.) of the image capture device 20 based at least in part on parameter values in the prediction model 14 associated with the particular types of scenes. For example, the prediction model 14 might include the exposure control brightness parameters (e.g., exposure time, analog gain, digital gain, flash) for a particular type of high dynamic range scene such as, for example, a bright sky with a person standing in the foreground, wherein the image capture device 20 may determine that a similar type of scene is being photographed in real-time. In such a case, the image capture device 20 may use the exposure control brightness parameters in the prediction model 14 to generate images 22 that are optimized depending on the type of scene contained in the images 22 (e.g., optimized for images of a bright sky with a person in the foreground).

Of particular note is that the image capture device 20 is not hardcoded with any fixed brightness targets in the illustrated example. Rather, the prediction model 14 may simply provide the image capture device 20 with the appropriate scene characteristics and corresponding parameter values for the image capture device 20 to quickly detect special scenes and converge on the optimal real-time parameters that optimize the images 22 relative to the reference images 16. In this regard, the reference images 16, which may be generated (e.g., using an offline image processing tool and/or different image capture device) by the manufacturer of the image capture device 20 and/or end user (e.g., photographer), may represent a wide variety of scene types. For example, another type of high dynamic range scene such as, for example, an indoor room with a bright window, might also be contained in the reference images 16, wherein the prediction model 14 may provide different scene characteristics and corresponding parameter values than for another type of high dynamic range scene (e.g., a bright sky with a person in the foreground). Thus, the illustrated machine learning approach enables the image capture device 20 to optimize images of many different types of scenes without concern over timing constraints and processing limits associated with real-time camera operation. The machine learning device 10 and the image capture device 20 may be implemented on the same or different platforms.

Figure 1B:
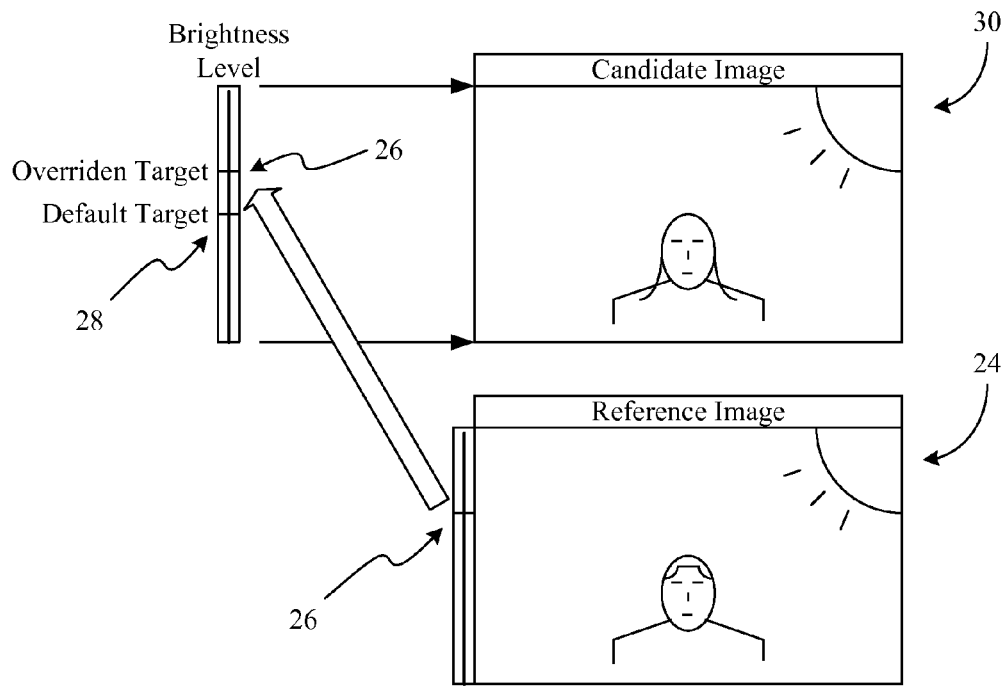
FIG. 1B is an illustration of an example of a brightness target determination according an embodiment.

FIG. 1B shows a reference image 24 having a brightness target level 26 that is used to override a default brightness target level 28 associated with a candidate image 30 in real-time. The reference image 24 may generally be used in an offline prediction analysis to generate a parameter prediction model such as, for example, the prediction model 14 (FIG. 1A), wherein the candidate image 30 may generally represent an image to be optimized such as, for example, one of the optimized images 22 (FIG. 1A). In the illustrated example, both the reference image 24 and the candidate image 30 contain a bright sky with a person in the foreground, which may be considered a "special scene" by either the manufacturer or end user of the image capture device. Accordingly, knowledge learned about that particular type of scene during the offline prediction analysis may be used to override the default brightness target level 28 with the brightness target level 26 associated with the reference image 24.

Figure 2:
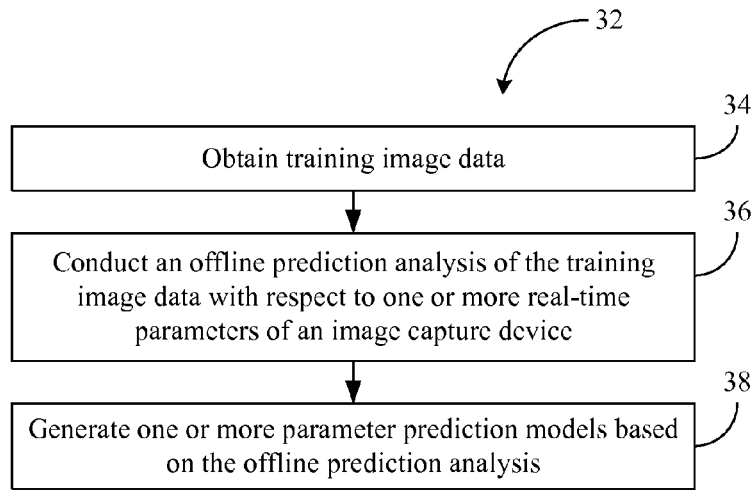
FIG. 2 is a flowchart of an example of a method of operating a machine learning device according to an embodiment.

Turning now to FIG. 2, a method 32 of operating a machine learning device is shown. The method 32 may generally be implemented in a machine learning device such as, for example, the machine learning device 10 (FIG. 1), already discussed. More particularly, the method 32 may be implemented as one or more modules in executable software as a set of logic instructions stored in a machine- or computer-readable storage medium of a memory such as random access memory (RAM), read only memory (ROM), programmable ROM (PROM), firmware, flash memory, etc., in configurable logic such as, for example, programmable logic arrays (PLAs), field programmable gate arrays (FPGAs), complex programmable logic devices (CPLDs), in fixed-functionality logic hardware using circuit technology such as, for example, application specific integrated circuit (ASIC), complementary metal oxide semiconductor (CMOS) or transistor-transistor logic (TTL) technology, or any combination thereof.

Illustrated processing block 34 provides for obtaining training image data, wherein the training image data may include reference images of particular types of scenes and candidate images associated with an image capture device. Illustrated block 36 conducts an offline prediction analysis of the training image data with respect to one or more real-time parameters of the image capture device. Block 36 may include identifying a set of "candidate" features (e.g., edges, corners, histograms and/or other statistics) based on the training image data and selecting a set of "analysis" features from the set of candidate features.

More particularly, the image capture pipeline may contain automatic exposure, automatic focus, and automatic white balance components that compute image statistics. Most of these statistics may be computed at each "tile" in the image (e.g. if the image size is 1000×1000 pixels and the tile size is 50×50 pixels, then the number of tiles is 20×20=400 tiles per image), while other statistics may be computed globally for the entire image (such as a global histogram). Additionally, the statistics may make use of both color and luminance information as well as the output of relevant image filters and histogram data.

As a result, the number of features may be relatively high. For example, even when the number of tiles is 8×8=64, the number of image dimensions may be on the order of 1700. Therefore, once the set of candidate features has been identified, a feature/attribute ranking or selection solution may be used to select the set of analysis features. The feature selection may generally evaluate the worth/rank of an attribute by measuring how similar/close the predicted class values are when the attribute values are similar/close. The feature selection may use algorithms/libraries readily available in machine learning (ML) software packages such as, for example, the "ReliefFAttributeEval" library from WEKA (University of Waikato). In one example, a certain number (e.g., two hundred) of the top ranked attributes may be used as the selected set of analysis features.

Processing block 36 may also provide for segmenting images in the training image data into a plurality of regions based on luminance intensity and the set of candidate features, and extracting ground truth data from the training image data on a per-region basis, wherein the offline prediction analysis is conducted further based on the ground truth data. More particularly, three types of pixels may be extracted: "shadows", "mid-tones" and "highlights". The segmentation may be performed on grayscale images (Luma channel) in linear space (i.e. without Gamma correction applied) and may not use special image information.

To increase robustness of the segmentation, the white and black pixels may first be located. To do so, it may be assumed that the image grayscale values are to be scaled to a 0 . . . 1 range. The white pixels may be defined as those with $g>=0.95$, where g is the pixel gray value. The black pixels may be defined as those with $g<0.05$, wherein the white and black pixels may be ignored for the rest of the segmentation process. To build the exposure independent segmentation, a histogram equalization may be performed on the image (excluding the white and black regions). This tonal operation may modify the pixel values so that the histogram of the resulting image is as close as possible to the uniform one. On the equalized image, the pixels may be split according to their grayscale values as following:

shadows: $0.05 \leq g < 0.25$
midtones: $0.25 \leq g < 0.75$
highlights: $0.75 \leq g < 0.95$ The values provided herein are to facilitate discussion only and may vary depending on the circumstances. Moreover, the regions may be defined based on other attributes such as, for example, level of focus, white balance state, and so forth. The brightness of each region may then calculated as an average value of the pixels in it, wherein the calculation may operate on either full size images, or reduced size images resulting from the image statistics (e.g., automatic white balance and red, green, blue, sync/RGBS) output. Thus, ground truth data such as, for example, average brightness, may be extracted, on a per-region basis, from the training image data based on the segmentation results and the set of candidate features. Moreover, the ground truth data and the set of analysis features may be used to conduct the offline prediction analysis.

Block 38 may generate one or more parameter prediction models based on the offline prediction analysis. Each parameter prediction model may generally include a plurality of neural network nodes having parameter values. More particularly, the parameter prediction model may use feature weights and threshold values at each node, as well as node weights and threshold values for the model itself. For example, when using a neural network multilayer perceptron model to perform the numerical prediction (or regression), the threshold values may be computed directly using a neural net library tool such as, for example, the MATLAB (a registered mark of Mathworks, Inc.) training component software tool. In one example, a set of analysis features containing, for example, two hundred features may be combined with a one hundred node, single layer neural net model. Other prediction models such as, for example, tree-based prediction models, non-linear least squares, least squares support vector machine, etc., may also be used.

Figure 3:
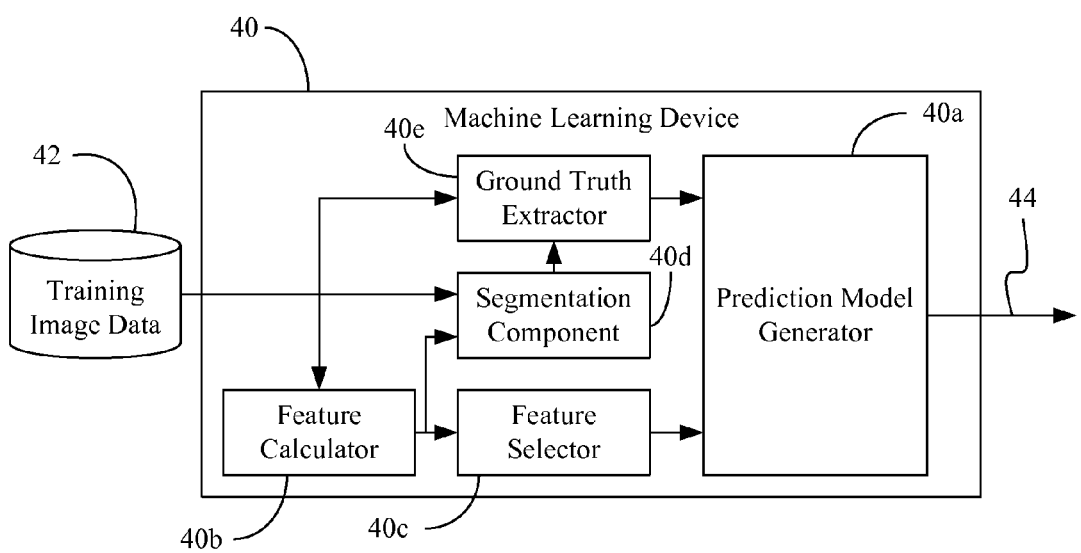
FIG. 3 is a block diagram of an example of a machine learning device according to an embodiment.

FIG. 3 shows a machine learning device 40 (40a-40e). The machine learning device 40 may be readily substituted for the machine learning device 10 (FIG. 1A), already discussed. In the illustrated example, the machine learning device 40 obtains training image data 42 (e.g., reference images of particular types of scenes and candidate images associated with an image capture device), wherein a prediction model generator 40a conducts an offline prediction analysis of the training image data 42 with respect to one or more real-time parameters of an image capture device. The real-time parameters may include, for example, exposure control brightness parameters, tone mapping brightness parameters, focus parameters, white balance parameters, and so forth. The machine learning device 40 may include a feature calculator 40b (e.g., statistics calculator) to identify a set of candidate features based on the training image data 42 and a feature selector 40c to select a set of analysis features from the set of candidate features, wherein the prediction model generator 40a may conduct the offline prediction analysis based on the set of set of analysis features.

The machine learning device 40 may also include a segmentation component 40d to segment images in the training image data 42 into a plurality of regions based on luminance intensity. A ground truth extractor 40e may extract ground truth data (e.g., average brightness) from the training image data on a per-region basis, wherein the prediction model generator 40a may conduct the offline prediction analysis further based on the ground truth data. The illustrated prediction model generator 40a generates one or more parameter prediction models 44 based on the offline prediction analysis. As already noted, each parameter prediction model 44 may correspond to a type of scene and include a plurality of neural network nodes having parameter values.

Figure 4:
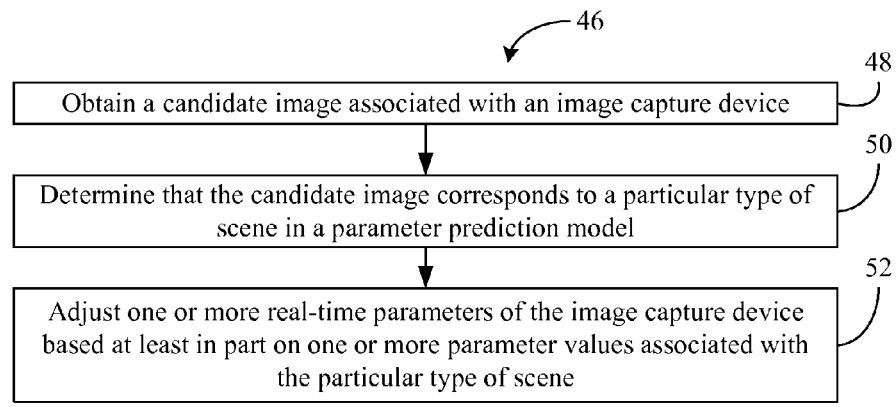
FIG. 4 is a flowchart of an example of a method of operating an image capture device according to an embodiment.

Turning now to FIG. 4, a method 46 of operating an image capture device is shown. The method 46 may generally be implemented in an image capture device such as, for example, the machine learning device 20 (FIG. 1), already discussed. More particularly, the method 46 may be implemented as one or more modules in executable software as a set of logic instructions stored in a machine- or computer-readable storage medium of a memory such as RAM, ROM, PROM, firmware, flash memory, etc., in configurable logic such as, for example, PLAs, FPGAs, CPLDs, in fixed-functionality logic hardware using circuit technology such as, for example, ASIC, CMOS or TTL technology, or any combination thereof.

Illustrated processing block 48 provides for obtaining (e.g., as part of an iterative process to converge on optimal real-time parameters for a particular type of scene) a candidate image associated with an image capture device. The candidate image may therefore include pre-processed raw Bayer data. Block 50 may determine that the candidate image corresponds to a particular type of scene represented in a parameter prediction model. In one example, block 50 includes identifying a set of candidate features (e.g., edges, corners, histograms and/or other statistics) based on the candidate image and selecting a set of analysis features from the set of candidate features. Block 50 may also include selecting a parameter prediction model from a plurality of parameter prediction models based on a level of correspondence between the set of analysis features associated with the candidate image and the selected parameter prediction model.

One or more real-time parameters (e.g., brightness parameters, focus parameters, white balance parameters) of the image capture device may be adjusted at block 52 based on one or more parameter values associated with the particular type of scene. Block 52 may include computing the one or more parameter values from one or more neural network nodes in the parameter prediction model. For example, if the set of analysis features corresponding to the candidate image correlates heavily with certain nodes in the parameter prediction model, a sigmoid function (e.g., a logistic function having an "S" shape) may be computed at each correlated node to determine the node's contribution to the type of scene involved. The results of the sigmoid function may then be linearly combined to compute the estimated parameter value for the image. For example, in the case of brightness, the computation may determine an exposure control parameter value (e.g., exposure time, analog gain, digital gain, flash, etc.), a tone mapping parameter value, and so forth. Block 52 may also provide for segmenting the candidate image into a plurality of regions based on, for example, luminance intensity, as already discussed. The segmentation information may be used by other image pipeline components in the image capture device.

Figure 5:
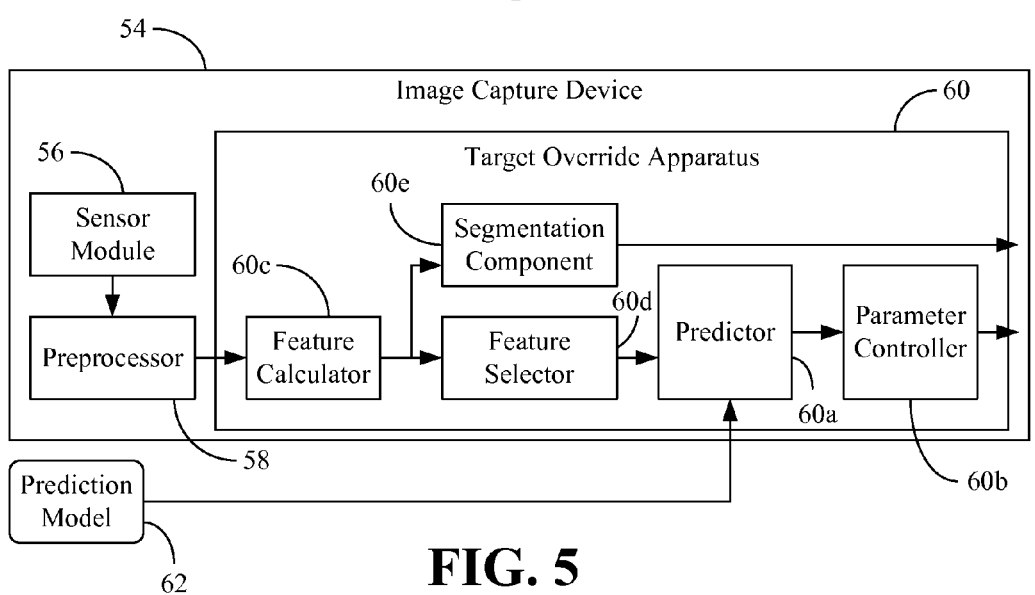
FIG. 5 is a block diagram of an example of an image capture device according to an embodiment.

FIG. 5 shows an image capture device 54. The image capture device 54 may readily be substituted for the image capture device 20 (FIG. 1A), already discussed. In the illustrated example, the image capture device 20 includes a sensor module 56 to capture candidate images (e.g., iteratively to converge on optimal real-time parameters for a particular type of scene) and a preprocessor 58 to obtain the candidate images from the sensor module 56. The preprocessor 58 may perform certain operations such as, for example, defect pixel correction, noise reduction, linearization, shading correction, etc., on the candidate images.

The illustrated image capture device 54 also includes a target override apparatus 60 (60a-60e) coupled to the preprocessor 58. The target override apparatus 60 may generally include a predictor 60a to determine/detect when candidate images correspond to a particular type of scene represented in a parameter prediction model 62. Additionally, a parameter controller 60b may adjust one or more real-time parameters (e.g., brightness parameters, focus parameters, white balance parameters, etc.) of the image capture device 54 based on one or more parameter values associated with the particular type of scene. In one example, the predictor 60a computes the one or more parameter values from one or more neural network nodes in the parameter prediction model 62.

Figure 6:
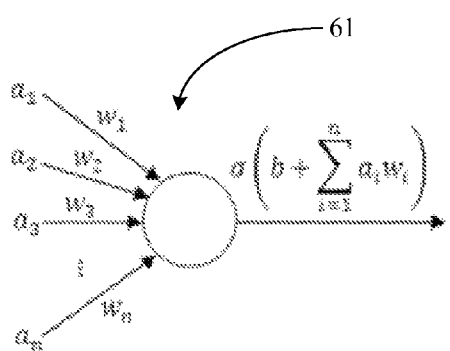
FIG. 6 is an illustration of an example of a signal node of a multilayer perceptron (MLP) neural network according to an embodiment.

The target override apparatus 60 may also include a feature calculator 60c (e.g. statistics calculator) to identify a set of candidate features based on the candidate images and a feature selector 60d to select a set of analysis features from the set of candidate features, wherein the parameter controller 60b may adjust the one or more real-time parameters further based on the set of analysis features. FIG. 6 shows an example of a signal node 61 of a multilayer perceptron (MLP) neural network, wherein the same feature vector is used at each node, but the weights and bias values may change at each node. The outputs of all of the nodes may be combined using the appropriate weights and bias values of the output layer. In the illustrated example, $\vec{a}=[a_1, \ldots a_{Nf}]$, represents the feature vector and $Nf$ is the number of features;

$\vec{w}_i=[w_{i,1}, \ldots w_{i,Nf}]$, represents the weights of each feature in the $i^{th}$ node;

$n_i=\sigma(b_i+\vec{a}\cdot\vec{w}_i)$, represents the value of the $i^{th}$ node and $B_i$ is the bias (or threshold) of the $i^{th}$ node;

$\sigma(x)$, is an activation function that can be linear, sigmoid, tan h, etc., as in the following;

$$\sigma(x) = \begin{cases} x, & \text{represents linear activation function} \\ 1/(1+e^{-x}), & \text{represents a sigmoid activation function} \\ \tanh(x), & \text{represents tanh function} \end{cases}$$

$\vec{n} = [n_1, \ldots n_{Nn}]$ represents the vector of values of each node that are combined at the output layer to compute the final prediction and Nn is the number of nodes;

$\vec{w}_0 = [w_{0,1}, \ldots w_{0,Nn}]$, represents the weights in the output layer (e.g., the contribution of each node to the final prediction computation;

$p = b_0 + \vec{n} \cdot \vec{w}_0$, represents the predicted final value, where b0 is the bias (or threshold) of the output layer and the activation function at the output layer is the linear function.

As already noted, other prediction models such as, for example, tree-based prediction models, non-linear least squares, least squares support vector machine, etc., may also be used. The illustrated target override apparatus 60 also includes a segmentation component 60e that segments the candidate images into a plurality of regions based on, for example, luminance intensity. The segmentation information may be used by other image pipeline components (not shown) in the image capture device 54.

Figure 7:
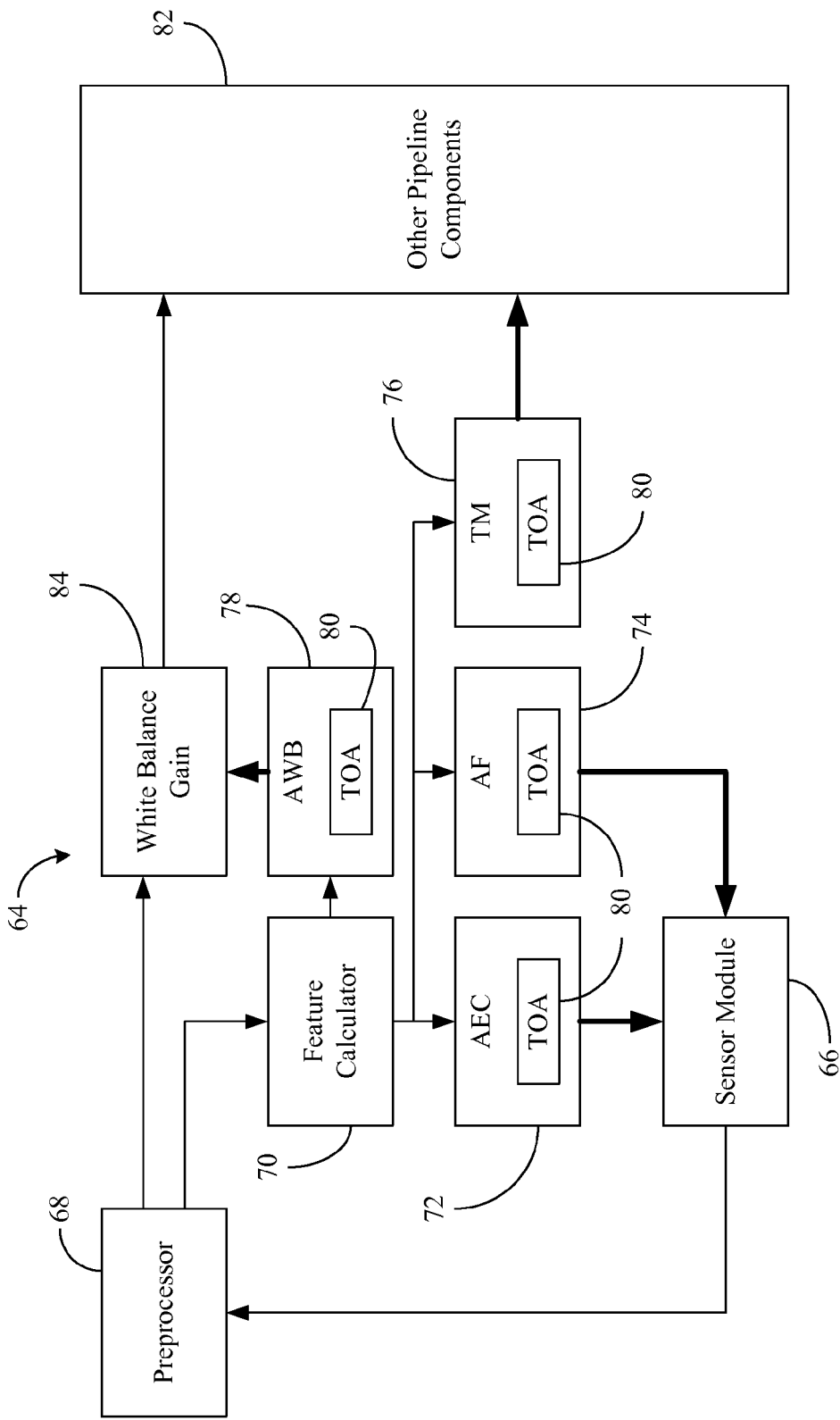
FIG. 7 is a block diagram of an example of an image capture device having a target override apparatus deployed in multiple components according to an embodiment.

Turning now to FIG. 7, one example of an image capture device 64 is shown in greater detail. In the illustrated example, a sensor module 66 captures candidate images (e.g., raw Bayer data), wherein a preprocessor 68 obtains the candidate images from the sensor module 66 and processes them (e.g., via defect pixel correction, noise reduction, linearization, shading correction, etc.). A feature calculator 70 may use image statistics to identify sets of candidate features based on the candidate images. The output of the feature calculator 70 may be provided to an automatic exposure control (AEC) component 72, an automatic focus (AF) component 74, a tone mapping (TM) component 76, an automatic white balance (AWB) component 78, and so forth. The AEC component 72 may generally maximize information content of images and the TM component 76 may decide the final brightness of images.

Of particular note is that a target override apparatus (TOA) 80 may be deployed in one or more of the AEC component 72, the AF component 74, the TM component 76, and the AWB component 78, wherein each TOA 80 may function similarly to the target override apparatus 60 (FIG. 5), already discussed. Thus, the TOA 80 in the AEC component 72 may control brightness for the sensor module 66 with exposure control parameters that are tailored to particular types of scenes represented in parameter prediction models generated by a machine learning device. Similarly, the TOA 86 in the TM component 76 may control brightness via other pipeline components 82 (e.g., gamma and tone mapping) with tone mapping parameters that are tailored to particular types of scenes represented in parameter prediction models. Additionally, the illustrated TOA 80 in the AF component 74 may control focus-related actuators in the sensor module 66 with focus parameters that are tailored to particular types of scenes represented in the parameter prediction models. Moreover, the TOA 80 in the AWB component 78 may conduct RGB gain control for a white balance gain component 84 with white balance parameters that are tailored to particular types of scenes represented in parameter prediction models.

Figure 8:
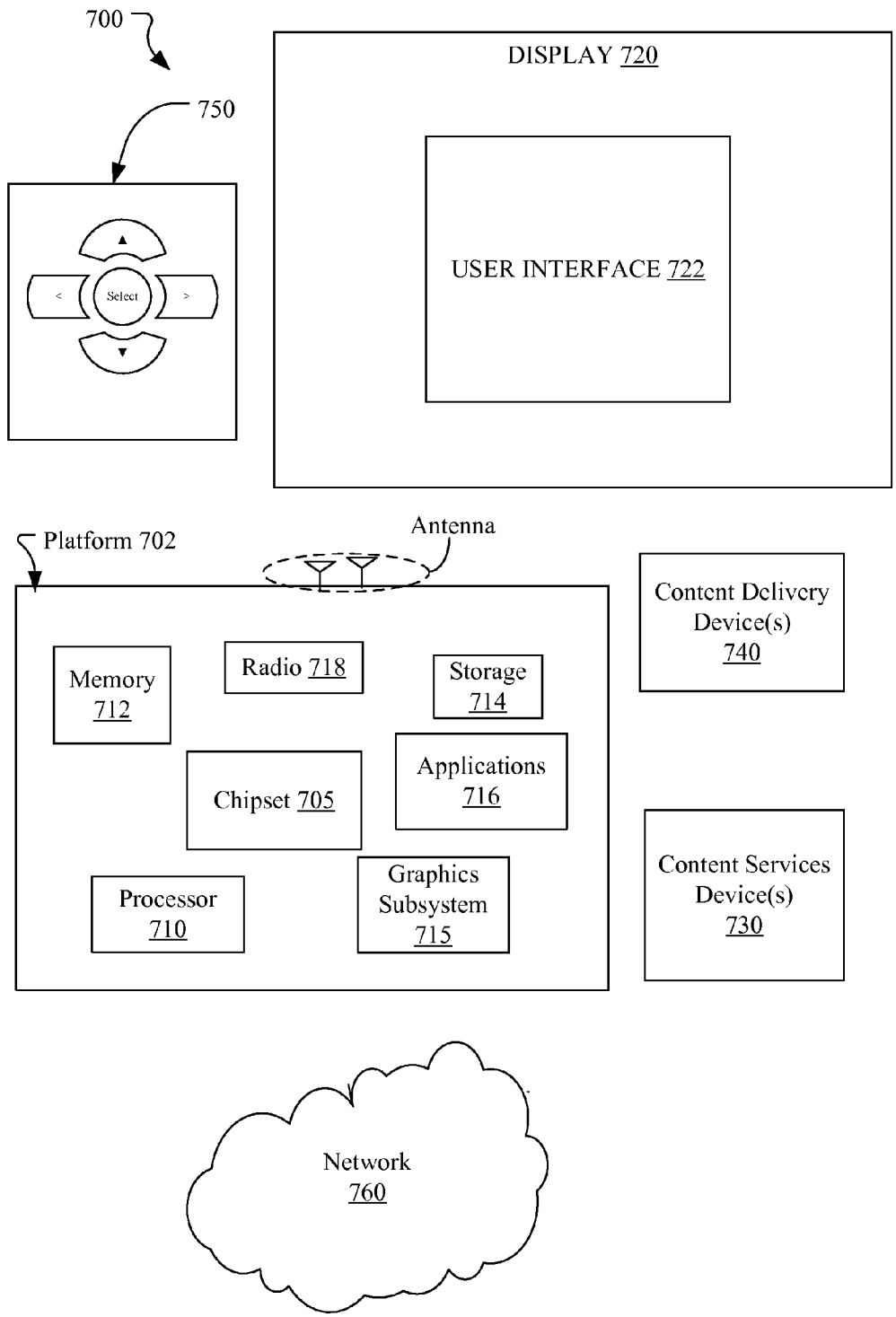
FIG. 8 is a block diagram of an example of a system having a navigation controller according to an embodiment.

FIG. 8 illustrates an embodiment of a system 700. In embodiments, system 700 may be a media system although system 700 is not limited to this context. For example, system 700 may be incorporated into a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

In embodiments, the system 700 comprises a platform 702 coupled to a display 720 that presents visual content. The platform 702 may receive video bitstream content from a content device such as content services device(s) 730 or content delivery device(s) 740 or other similar content sources. A navigation controller 750 comprising one or more navigation features may be used to interact with, for example, platform 702 and/or display 720. Each of these components is described in more detail below.

In embodiments, the platform 702 may comprise any combination of a chipset 705, processor 710, memory 712, storage 714, graphics subsystem 715, applications 716 and/or radio 718 (e.g., network controller). The chipset 705 may provide intercommunication among the processor 710, memory 712, storage 714, graphics subsystem 715, applications 716 and/or radio 718. For example, the chipset 705 may include a storage adapter (not depicted) capable of providing intercommunication with the storage 714.

The processor 710 may be implemented as Complex Instruction Set Computer (CISC) or Reduced Instruction Set Computer (RISC) processors, x86 instruction set compatible processors, multi-core, or any other microprocessor or central processing unit (CPU). In embodiments, the processor 710 may comprise dual-core processor(s), dual-core mobile processor(s), and so forth.

The memory 712 may be implemented as a volatile memory device such as, but not limited to, a Random Access Memory (RAM), Dynamic Random Access Memory (DRAM), or Static RAM (SRAM).

The storage 714 may be implemented as a non-volatile storage device such as, but not limited to, a magnetic disk drive, optical disk drive, tape drive, an internal storage device, an attached storage device, flash memory, battery backed-up SDRAM (synchronous DRAM), and/or a network accessible storage device. In embodiments, storage 714 may comprise technology to increase the storage performance enhanced protection for valuable digital media when multiple hard drives are included, for example.

The graphics subsystem 715 may perform processing of images such as still or video for display. The graphics subsystem 715 may be a graphics processing unit (GPU) or a visual processing unit (VPU), for example. An analog or digital interface may be used to communicatively couple the graphics subsystem 715 and display 720. For example, the interface may be any of a High-Definition Multimedia Interface, DisplayPort, wireless HDMI, and/or wireless HD compliant techniques. The graphics subsystem 715 could be integrated into processor 710 or chipset 705. The graphics subsystem 715 could be a stand-alone card communicatively coupled to the chipset 705. In one example, the graphics subsystem 715 includes an image capture device as described herein.

The graphics and/or video processing techniques described herein may be implemented in various hardware architectures. For example, graphics and/or video functionality may be integrated within a chipset. Alternatively, a discrete graphics and/or video processor may be used. As still another embodiment, the graphics and/or video functions may be implemented by a general purpose processor, including a multi-core processor. In a further embodiment, the functions may be implemented in a consumer electronics device.

The radio 718 may be a network controller including one or more radios capable of transmitting and receiving signals using various suitable wireless communications techniques. Such techniques may involve communications across one or more wireless networks. Exemplary wireless networks include (but are not limited to) wireless local area networks (WLANs), wireless personal area networks (WPANs), wireless metropolitan area network (WMANs), cellular networks, and satellite networks. In communicating across such networks, radio 718 may operate in accordance with one or more applicable standards in any version.

In embodiments, the display 720 may comprise any television type monitor or display. The display 720 may comprise, for example, a computer display screen, touch screen display, video monitor, television-like device, and/or a television. The display 720 may be digital and/or analog. In embodiments, the display 720 may be a holographic display. Also, the display 720 may be a transparent surface that may receive a visual projection. Such projections may convey various forms of information, images, and/or objects. For example, such projections may be a visual overlay for a mobile augmented reality (MAR) application. Under the control of one or more software applications 716, the platform 702 may display user interface 722 on the display 720.

In embodiments, content services device(s) 730 may be hosted by any national, international and/or independent service and thus accessible to the platform 702 via the Internet, for example. The content services device(s) 730 may be coupled to the platform 702 and/or to the display 720. The platform 702 and/or content services device(s) 730 may be coupled to a network 760 to communicate (e.g., send and/or receive) media information to and from network 760. The content delivery device(s) 740 also may be coupled to the platform 702 and/or to the display 720.

In embodiments, the content services device(s) 730 may comprise a cable television box, personal computer, network, telephone, Internet enabled devices or appliance capable of delivering digital information and/or content, and any other similar device capable of unidirectionally or bidirectionally communicating content between content providers and platform 702 and/display 720, via network 760 or directly. It will be appreciated that the content may be communicated unidirectionally and/or bidirectionally to and from any one of the components in system 700 and a content provider via network 760. Examples of content may include any media information including, for example, video, music, medical and gaming information, and so forth.

The content services device(s) 730 receives content such as cable television programming including media information, digital information, and/or other content. Examples of content providers may include any cable or satellite television or radio or Internet content providers. The provided examples are not meant to limit embodiments.

In embodiments, the platform 702 may receive control signals from a navigation controller 750 having one or more navigation features. The navigation features of the controller 750 may be used to interact with the user interface 722, for example. In embodiments, the navigation controller 750 may be a pointing device that may be a computer hardware component (specifically human interface device) that allows a user to input spatial (e.g., continuous and multi-dimensional) data into a computer. Many systems such as graphical user interfaces (GUI), and televisions and monitors allow the user to control and provide data to the computer or television using physical gestures.

Movements of the navigation features of the controller 750 may be echoed on a display (e.g., display 720) by movements of a pointer, cursor, focus ring, or other visual indicators displayed on the display. For example, under the control of software applications 716, the navigation features located on the navigation controller 750 may be mapped to virtual navigation features displayed on the user interface 722, for example. In embodiments, the controller 750 may not be a separate component but integrated into the platform 702 and/or the display 720. Embodiments, however, are not limited to the elements or in the context shown or described herein.

In embodiments, drivers (not shown) may comprise technology to enable users to instantly turn on and off the platform 702 like a television with the touch of a button after initial boot-up, when enabled, for example. Program logic may allow the platform 702 to stream content to media adaptors or other content services device(s) 730 or content delivery device(s) 740 when the platform is turned "off" In addition, chipset 705 may comprise hardware and/or software support for 5.1 surround sound audio and/or high definition 7.1 surround sound audio, for example. Drivers may include a graphics driver for integrated graphics platforms. In embodiments, the graphics driver may comprise a peripheral component interconnect (PCI) Express graphics card.

In various embodiments, any one or more of the components shown in the system 700 may be integrated. For example, the platform 702 and the content services device(s) 730 may be integrated, or the platform 702 and the content delivery device(s) 740 may be integrated, or the platform 702, the content services device(s) 730, and the content delivery device(s) 740 may be integrated, for example. In various embodiments, the platform 702 and the display 720 may be an integrated unit. The display 720 and content service device(s) 730 may be integrated, or the display 720 and the content delivery device(s) 740 may be integrated, for example. These examples are not meant to limit the embodiments.

In various embodiments, system 700 may be implemented as a wireless system, a wired system, or a combination of both. When implemented as a wireless system, system 700 may include components and interfaces suitable for communicating over a wireless shared media, such as one or more antennas, transmitters, receivers, transceivers, amplifiers, filters, control logic, and so forth. An example of wireless shared media may include portions of a wireless spectrum, such as the RF spectrum and so forth. When implemented as a wired system, system 700 may include components and interfaces suitable for communicating over wired communications media, such as input/output (I/O) adapters, physical connectors to connect the I/O adapter with a corresponding wired communications medium, a network interface card (NIC), disc controller, video controller, audio controller, and so forth. Examples of wired communications media may include a wire, cable, metal leads, printed circuit board (PCB), backplane, switch fabric, semiconductor material, twisted-pair wire, co-axial cable, fiber optics, and so forth.

The platform 702 may establish one or more logical or physical channels to communicate information. The information may include media information and control information. Media information may refer to any data representing content meant for a user. Examples of content may include, for example, data from a voice conversation, videoconference, streaming video, electronic mail ("email") message, voice mail message, alphanumeric symbols, graphics, image, video, text and so forth. Data from a voice conversation may be, for example, speech information, silence periods, background noise, comfort noise, tones and so forth. Control information may refer to any data representing commands, instructions or control words meant for an automated system. For example, control information may be used to route media information through a system, or instruct a node to process the media information in a predetermined manner. The embodiments, however, are not limited to the elements or in the context shown or described in FIG. 8.

Figure 9:
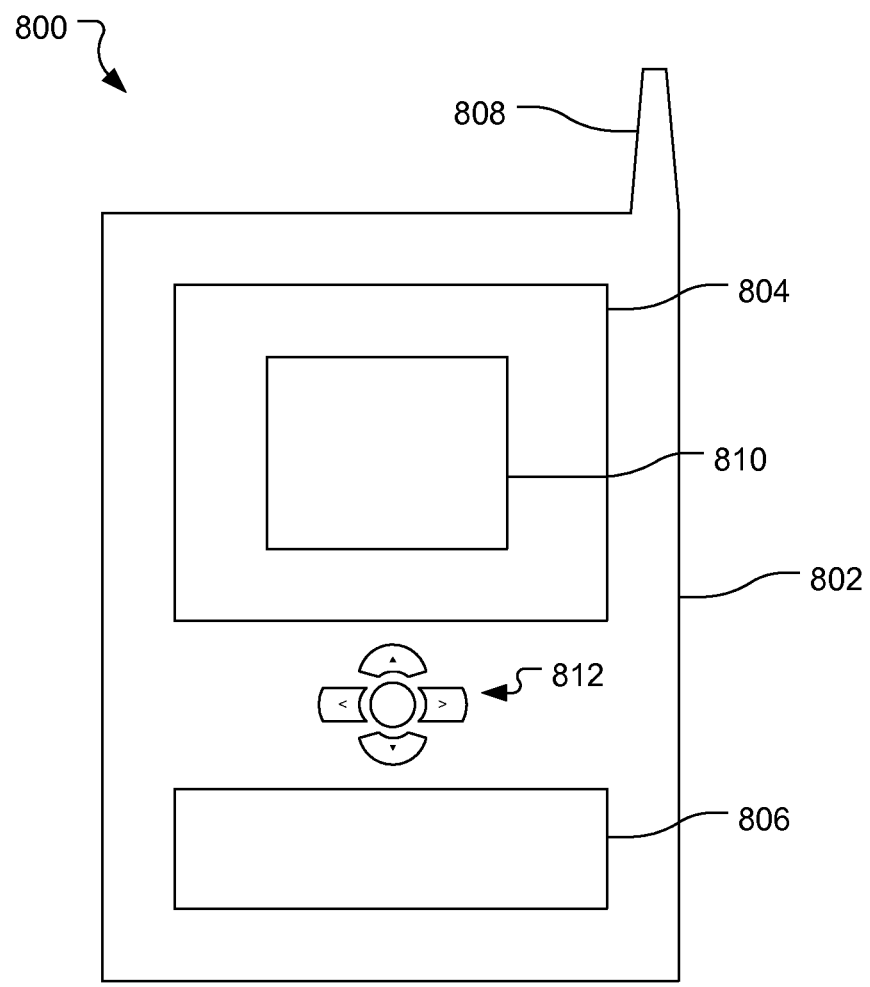
FIG. 9 is a block diagram of an example of a system having a small form factor according to an embodiment.

As described above, the system 700 may be embodied in varying physical styles or form factors. FIG. 9 illustrates embodiments of a small form factor device 800 in which the system 700 may be embodied. In embodiments, for example, the device 800 may be implemented as a mobile computing device having wireless capabilities. A mobile computing device may refer to any device having a processing system and a mobile power source or supply, such as one or more batteries, for example.

As described above, examples of a mobile computing device may include a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

Examples of a mobile computing device also may include computers that are arranged to be worn by a person, such as a wrist computer, finger computer, ring computer, eyeglass computer, belt-clip computer, arm-band computer, shoe computers, clothing computers, and other wearable computers. In embodiments, for example, a mobile computing device may be implemented as a smart phone capable of executing computer applications, as well as voice communications and/or data communications. Although some embodiments may be described with a mobile computing device implemented as a smart phone by way of example, it may be appreciated that other embodiments may be implemented using other wireless mobile computing devices as well. The embodiments are not limited in this context.

As shown in FIG. 9, the device 800 may comprise a housing 802, a display 804, an input/output (I/O) device 806, and an antenna 808. The device 800 also may comprise navigation features 812. The display 804 may comprise any suitable display unit for displaying information appropriate for a mobile computing device. The I/O device 806 may comprise any suitable I/O device for entering information into a mobile computing device. Examples for the I/O device 806 may include an alphanumeric keyboard, a numeric keypad, a touch pad, input keys, buttons, switches, rocker switches, microphones, speakers, voice recognition device and software, and so forth. Information also may be entered into the device 800 by way of microphone. Such information may be digitized by a voice recognition device. The embodiments are not limited in this context.

Additional Notes And Examples:

Example 1 may include an image capture device comprising a sensor module to capture a candidate image, a preprocessor to obtain the candidate image from the sensor module, and a target override apparatus coupled to the preprocessor, the target override apparatus including a predictor to determine that the candidate image corresponds to a particular type of scene represented in a parameter prediction model, and a parameter controller to adjust one or more real-time parameters of the image capture device based at least in part on one or more parameter values associated with the particular type of scene.

Example 2 may include the image capture device of Example 1, wherein the predictor is to compute the one or more parameter values from one or more neural network nodes in the parameter prediction model.

Example 3 may include the image capture device of Example 1, wherein the one or more real-time parameters are to include one or more of an exposure control brightness parameter, a tone mapping brightness parameter, a focus parameter or a white balance parameter.

Example 4 may include the image capture device of Example 1, wherein the target override apparatus further includes a segmentation component to segment the candidate image into a plurality of regions based on luminance intensity.

Example 5 may include the image capture device of any one of Examples 1 to 4, wherein the target override apparatus further includes a feature calculator to identify a set of candidate features based on the candidate image, and a feature selector to select a set of analysis features from the set of candidate features, wherein the one or more real-time parameters are to be adjusted further based on the set of analysis features.

Example 6 may include the image capture device of Example 5, wherein the predictor is to select the parameter prediction model from a plurality of parameter prediction models based on a level of correspondence between the set of analysis features and the selected parameter prediction model.

Example 7 may include at least one computer readable storage medium comprising a set of instructions which, when executed by an image capture device, cause the image capture device to obtain a candidate image associated with the image capture device, determine that the candidate image corresponds to a particular type of scene represented in a parameter prediction model, and adjust one or more real-time parameters of the image capture device based at least in part on one or more parameter values associated with the particular type of scene.

Example 8 may include the at least one computer readable storage medium of Example 7, wherein the instructions, when executed, cause the image capture device to compute the one or more parameter values from one or more neural network nodes in the parameter prediction model.

Example 9 may include the at least one computer readable storage medium of Example 7, wherein the one or more real-time parameters are to include one or more of an exposure control brightness parameter, a tone mapping brightness parameter, a focus parameter or a white balance parameter.

Example 10 may include he at least one computer readable storage medium of Example 7, wherein the instructions, when executed, cause the image capture device to segment the candidate image into a plurality of regions based on luminance intensity.

Example 11 may include the at least one computer readable storage medium of any one of Examples 7 to 10, wherein the instructions, when executed, cause the image capture device to identify a set of candidate features based on the candidate image, and select a set of analysis features from the set of candidate features, wherein the one or more real-time parameters are to be adjusted further based on the set of analysis features.

Example 12 may include the at least one computer readable storage medium of Example 11, wherein the instructions, when executed, cause the image capture device to select the parameter prediction model from a plurality of parameter prediction models based on a level of correspondence between the set of analysis features and the selected parameter prediction model.

Example 13 may include a method of operating a machine learning device, comprising obtaining training image data, conducting an offline prediction analysis of the training image data with respect to one or more real-time parameters of an image capture device, and generating one or more parameter prediction models based on the offline prediction analysis.

Example 14 may include the method of Example 13, wherein each parameter prediction model includes a plurality of neural network nodes having parameter values.

Example 15. The method of Example 13, wherein the offline prediction analysis is conducted with respect to one or more of an exposure control brightness parameter, a tone mapping brightness parameter, a focus parameter or a white balance parameter.

Example 16 may include the method of Example 13, wherein the training image data includes reference images of particular types of scenes and candidate images associated with the image capture device.

Example 17 may include the method of any Example 13, further including segmenting images in the training image data into a plurality of regions based on luminance intensity, and extracting ground truth data from the training image data on a per-region basis, wherein the offline prediction analysis is conducted based at least in part on the ground truth data.

Example 18 may include the method of any one of Examples 13 to 17, further including identifying a set of candidate features based on the training image data, and selecting a set of analysis features from the set of candidate features, wherein the offline prediction analysis is conducted based at least in part on the set of analysis features.

Example 19 may include at least one computer readable storage medium comprising a set of instructions which, when executed by a machine learning device, cause the machine learning device to obtain training image data, conduct an offline prediction analysis of the training image data with respect to one or more real-time parameters of an image capture device, and generate one or more parameter prediction models based on the offline prediction analysis.

Example 20 may include the at least one computer readable storage medium of Example 19, wherein each parameter prediction model is to include a plurality of neural network nodes having parameter values.

Example 21 may include the at least one computer readable storage medium of Example 19, wherein the offline prediction analysis is conducted with respect to one or more of an exposure control brightness parameter, a tone mapping brightness parameter, a focus parameter or a white balance parameter.

Example 22 may include the at least one computer readable storage medium of Example 19, wherein the training image data is to include reference images of particular types of scenes and candidate images associated with the image capture device.

Example 23 may include the at least one computer readable storage medium of any one of Examples 19, wherein the instructions, when executed, cause the machine learning device to segment images in the training image data into a plurality of regions based on luminance intensity, and extract ground truth data from the training image data on a per-region basis, wherein the offline prediction analysis is to be conducted based at least in part on the ground truth data.

Example 24 may include the at least one computer readable storage medium of any one of Examples 19 to 23, wherein the instructions, when executed, cause the machine learning device to identify a set of candidate features based on the training image data, and select a set of analysis features from the set of candidate features, wherein the offline prediction analysis is to be conducted based at least in part on the set of analysis features.

Example 25 may include a method of operating an image capture device, comprising obtaining a candidate image associated with the image capture device, determining that the candidate image corresponds to a particular type of scene represented in a parameter prediction model, and adjusting one or more real-time parameters of the image capture device based at least in part on one or more parameter values associated with the particular type of scene.

Example 26 may include the method of Example 25, further including computing the one or more parameter values from one or more neural network nodes in the parameter prediction model.

Example 27 may include the method of Example 25, wherein adjusting one or more real-time parameters includes adjusting one or more of an exposure control brightness parameter, a tone mapping brightness parameter, a focus parameter or a white balance parameter.

Example 28 may include the method of Example 25, further including segmenting the candidate image into a plurality of regions based on luminance intensity.

Example 29 may include the method of any one of Examples 25 to 28, further including identifying a set of candidate features based on the candidate image, and selecting a set of analysis features from the set of candidate features, wherein the one or more real-time parameters are adjusted further based on the set of analysis features.

Example 30 may include the method of Example 29, further including selecting the parameter prediction model from a plurality of parameter prediction models based on a level of correspondence between the set of analysis features and the selected parameter prediction model.

Example 31 may include a target override apparatus comprising a predictor to obtain a candidate image associated with an image capture device and determine that the candidate image corresponds to a particular type of scene represented in a parameter prediction model, and a parameter controller to adjust one or more real-time parameters of the image capture device based at least in part on one or more parameter values associated with the particular type of scene.

Example 32 may include the target override apparatus of Example 31, wherein the predictor is to compute the one or more parameter values from one or more neural network nodes in the parameter prediction model.

Example 33 may include the target override apparatus of Example 31, wherein the one or more real-time parameters are to include one or more of an exposure control brightness parameter, a tone mapping brightness parameter, a focus parameter or a white balance parameter.

Example 34 may include the target override apparatus of Example 31, further including a segmentation component to segment the candidate image into a plurality of regions based on luminance intensity.

Example 35 may include the target override apparatus of any one of Examples 31 to 34, further including a feature calculator to identify a set of candidate features based on the candidate image, and a feature selector to select a set of analysis features from the set of candidate features, wherein the one or more real-time parameters are to be adjusted further based on the set of analysis features.

Example 36 may include the target override apparatus of Example 35, wherein the predictor is to select the parameter prediction model from a plurality of parameter prediction models based on a level of correspondence between the set of analysis features and the selected parameter prediction model.

Example 37 may include a machine learning device comprising means for obtaining training image data means for conducting an offline prediction analysis of the training image data with respect to one or more real-time parameters of an image capture device, and means for generating one or more parameter prediction models based on the offline prediction analysis.

Example 38 may include the machine learning device of Example 37, wherein each parameter prediction model is to include a plurality of neural network nodes having parameter values.

Example 39 may include the machine learning device of Example 37, wherein the offline prediction analysis is to be conducted with respect to one or more of an exposure control brightness parameter, a tone mapping brightness parameter, a focus parameter or a white balance parameter.

Example 40 may include the machine learning device of Example 37, wherein the training image data is to include reference images of particular types of scenes and candidate images associated with the image capture device.

Example 41 may include the machine learning device of Example 37, further including means for segmenting images in the training image data into a plurality of regions based on luminance intensity, and means for extracting ground truth data from the training image data on a per-region basis, wherein the offline prediction analysis is conducted based at least in part on the ground truth data.

Example 42 may include the machine learning device of any one of Examples 37 to 41, further including means for identifying a set of candidate features based on the training image data, and means for selecting a set of analysis features from the set of candidate features, wherein the offline prediction analysis is conducted based at least in part on the set of analysis features.

Example 43 may include an image capture device comprising means for obtaining a candidate image associated with the image capture device, means for determining that the candidate image corresponds to a particular type of scene represented in a parameter prediction model, and means for adjusting one or more real-time parameters of the image capture device based at least in part on one or more parameter values associated with the particular type of scene.

Example 44 may include the image capture device of Example 43, further including means for computing the one or more parameter values from one or more neural network nodes in the parameter prediction model.

Example 45 may include the image capture device of Example 43, wherein the means for adjusting one or more real-time parameters includes means for adjusting one or more of an exposure control brightness parameter, a tone mapping brightness parameter, a focus parameter or a white balance parameter.

Example 46 may include the image capture device of Example 43, further including means for segmenting the candidate image into a plurality of regions based on luminance intensity.

Example 47 may include the image capture device of any one of Examples 43 to 46, further including means for identifying a set of candidate features based on the candidate image, and means for selecting a set of analysis features from the set of candidate features, wherein the one or more real-time parameters are adjusted further based on the set of analysis features.

Example 48 may include the image capture device of Example 47, further including means for selecting the parameter prediction model from a plurality of parameter prediction models based on a level of correspondence between the set of analysis features and the selected parameter prediction model.

Techniques may provide a way to distinguish conflicting special scenes from each other at runtime, and determine the optimal target parameter values for each of them, without having to write dedicated code for the special scene detection. User preference/behaviors with regard to image exposure adjustments may also be learned and modeled. The model may be applied, in real-time, to the camera's image processing software/drivers. The time and cost savings associated with such an approach may be substantial. Additionally, segmentation techniques may enable adjustments to be made to the point of focus in an image (e.g., if shadows or highlights are to be in focus, those regions may be processed separately). Moreover, photographers may train their image capture devices to process images to their own unique (and subjective) tastes.

Various embodiments may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

Embodiments are applicable for use with all types of semiconductor integrated circuit ("IC") chips. Examples of these IC chips include but are not limited to processors, controllers, chipset components, programmable logic arrays (PLAs), memory chips, network chips, and the like. In addition, in some of the drawings, signal conductor lines are represented with lines. Some may be different, to indicate more constituent signal paths, have a number label, to indicate a number of constituent signal paths, and/or have arrows at one or more ends, to indicate primary information flow direction. This, however, should not be construed in a limiting manner. Rather, such added detail may be used in connection with one or more exemplary embodiments to facilitate easier understanding of a circuit. Any represented signal lines, whether or not having additional information, may actually comprise one or more signals that may travel in multiple directions and may be implemented with any suitable type of signal scheme, e.g., digital or analog lines implemented with differential pairs, optical fiber lines, and/or single-ended lines.

Example sizes/models/values/ranges may have been given, although embodiments are not limited to the same. As manufacturing techniques (e.g., photolithography) mature over time, it is expected that devices of smaller size could be manufactured. In addition, well known power/ground connections to IC chips and other components may or may not be shown within the figures, for simplicity of illustration and discussion, and so as not to obscure certain aspects of the embodiments. Further, arrangements may be shown in block diagram form in order to avoid obscuring embodiments, and also in view of the fact that specifics with respect to implementation of such block diagram arrangements are highly dependent upon the platform within which the embodiment is to be implemented, i.e., such specifics should be well within purview of one skilled in the art. Where specific details (e.g., circuits) are set forth in order to describe example embodiments, it should be apparent to one skilled in the art that embodiments can be practiced without, or with variation of, these specific details. The description is thus to be regarded as illustrative instead of limiting.

Some embodiments may be implemented, for example, using a machine or tangible computer-readable medium or article which may store an instruction or a set of instructions that, if executed by a machine, may cause the machine to perform a method and/or operations in accordance with the embodiments. Such a machine may include, for example, any suitable processing platform, computing platform, computing device, processing device, computing system, processing system, computer, processor, or the like, and may be implemented using any suitable combination of hardware and/or software. The machine-readable medium or article may include, for example, any suitable type of memory unit, memory device, memory article, memory medium, storage device, storage article, storage medium and/or storage unit, for example, memory, removable or non-removable media, erasable or non-erasable media, writeable or re-writeable media, digital or analog media, hard disk, floppy disk, Compact Disk Read Only Memory (CD-ROM), Compact Disk Recordable (CD-R), Compact Disk Rewriteable (CD-RW), optical disk, magnetic media, magneto-optical media, removable memory cards or disks, various types of Digital Versatile Disk (DVD), a tape, a cassette, or the like. The instructions may include any suitable type of code, such as source code, compiled code, interpreted code, executable code, static code, dynamic code, encrypted code, and the like, implemented using any suitable high-level, low-level, object-oriented, visual, compiled and/or interpreted programming language.

Unless specifically stated otherwise, it may be appreciated that terms such as "processing," "computing," "calculating," "determining," or the like, refer to the action and/or processes of a computer or computing system, or similar electronic computing device, that manipulates and/or transforms data represented as physical quantities (e.g., electronic) within the computing system's registers and/or memories into other data similarly represented as physical quantities within the computing system's memories, registers or other such information storage, transmission or display devices. The embodiments are not limited in this context.

The term "coupled" may be used herein to refer to any type of relationship, direct or indirect, between the components in question, and may apply to electrical, mechanical, fluid, optical, electromagnetic, electromechanical or other connections. In addition, the terms "first", "second", etc. may be used herein only to facilitate discussion, and carry no particular temporal or chronological significance unless otherwise indicated.

Those skilled in the art will appreciate from the foregoing description that the broad techniques of the embodiments can be implemented in a variety of forms. Therefore, while the embodiments of this have been described in connection with particular examples thereof, the true scope of the embodiments should not be so limited since other modifications will become apparent to the skilled practitioner upon a study of the drawings, specification, and following claims.

We claim:

1. An image capture device comprising:
a sensor module to capture a candidate image including a default image characteristic level; and
a target override apparatus including:
a predictor to determine that the candidate image includes a scene that is similar to a particular type of scene represented in a parameter prediction model based on training image data, wherein the training image data is based on a reference image including an image characteristic target level for the particular type of scene; and
a parameter controller to adjust one or more real-time parameters of the image capture device based on the determination that the candidate image includes a scene that is similar to the particular type of scene and one or more parameter values associated with the image characteristic target level for the particular type of scene to generate an optimized image corresponding to the candidate image that includes the image characteristic target level.

2. The image capture device of claim 1, wherein the predictor is to compute the one or more parameter values from one or more neural network nodes in the parameter prediction model.

3. The image capture device of claim 1, wherein the one or more real-time parameters are to include one or more of an exposure control brightness parameter, a tone mapping brightness parameter, a focus parameter or a white balance parameter.

4. The image capture device of claim 1, wherein the target override apparatus further includes a segmentation component to segment the candidate image into a plurality of regions based on luminance intensity.

5. The image capture device of claim 1, wherein the target override apparatus further includes:

a feature calculator to identify a set of candidate features based on the candidate image; and a feature selector to select a set of analysis features from the set of candidate features, wherein the one or more real-time parameters are to be adjusted further based on the set of analysis features.

6. The image capture device of claim 5, wherein the predictor is to select the parameter prediction model from a plurality of parameter prediction models based on a level of correspondence between the set of analysis features and the selected parameter prediction model.

7. At least one non-transitory computer readable storage medium comprising a set of instructions which, when executed by an image capture device, cause the image capture device to:

obtain a candidate image associated with the image capture device including a default image characteristic level;

determine that the candidate image includes a scene that is similar to a particular type of scene represented in a parameter prediction model based on training image data, wherein the training image data is based on a reference image including an image characteristic target level for the particular type of scene; and adjust one or more real-time parameters of the image capture device based on the determination that the candidate image includes a scene that is similar to the particular type of scene and one or more parameter values associated with the image characteristic target level for the particular type of scene to generate an optimized image corresponding to the candidate image that includes the image characteristic target level.

8. The at least one computer readable storage medium of claim 7, wherein the instructions, when executed, cause the image capture device to compute the one or more parameter values from one or more neural network nodes in the parameter prediction model.

9. The at least one computer readable storage medium of claim 7, wherein the one or more real-time parameters are to include one or more of an exposure control brightness parameter, a tone mapping brightness parameter, a focus parameter or a white balance parameter.

10. The at least one computer readable storage medium of claim 7, wherein the instructions, when executed, cause the image capture device to segment the candidate image into a plurality of regions based on luminance intensity.

11. The at least one computer readable storage medium of claim 7, wherein the instructions, when executed, cause the image capture device to:

identify a set of candidate features based on the candidate image; and select a set of analysis features from the set of candidate features, wherein the one or more real-time parameters are to be adjusted further based on the set of analysis features.

12. The at least one computer readable storage medium of claim 11, wherein the instructions, when executed, cause the image capture device to select the parameter prediction model from a plurality of parameter prediction models based on a level of correspondence between the set of analysis features and the selected parameter prediction model.

13. A method of operating a machine learning device, comprising:

obtaining training image data, wherein the training image data is based on a reference image including an image characteristic target level for a particular type of scene to be represented in a parameter prediction model;

conducting an offline prediction analysis of the training image data with respect to one or more real-time parameters of an image capture device; and generating one or more parameter prediction models based on the offline prediction analysis, wherein a determination is to be made that a candidate image including a default image characteristic level includes a scene that is similar to the particular type of scene based on the training image data, and wherein an adjustment is to be made to the one or more real-time parameters of the image capture device based on the determination that the candidate image includes the scene that is similar to the particular type of scene and one or more parameter values associated with the image characteristic target level for the particular type of scene to generate an optimized image corresponding to the candidate image that includes the image characteristic target level.

14. The method of claim 13, wherein each parameter prediction model includes a plurality of neural network nodes having parameter values.

15. The method of claim 13, wherein the offline prediction analysis is conducted with respect to one or more of an exposure control brightness parameter, a tone mapping brightness parameter, a focus parameter or a white balance parameter.

16. The method of claim 13, wherein the training image data includes reference images of particular types of scenes and candidate images associated with the image capture device.

17. The method of claim 13, further including:

segmenting images in the training image data into a plurality of regions based on luminance intensity; and extracting ground truth data from the training image data on a per-region basis, wherein the offline prediction analysis is conducted based at least in part on the ground truth data.

18. The method of claim 13, further including:

identifying a set of candidate features based on the training image data; and selecting a set of analysis features from the set of candidate features, wherein the offline prediction analysis is conducted based at least in part on the set of analysis features.

19. At least one computer readable storage medium comprising a set of instructions which, when executed by an machine learning device, cause the machine learning device to:

obtain training image data, wherein the training image data is based on a reference image including an image characteristic target level for a particular type of scene to be represented in a parameter prediction model;

conduct an offline prediction analysis of the training image data with respect to one or more real-time parameters of an image capture device; and generate one or more parameter prediction models based on the offline prediction analysis, wherein a determination is to be made that a candidate image including a default image characteristic level includes a scene that is similar to the particular type of scene based on the training image data, and wherein an adjustment is to be made to the one or more real-time parameters of the image capture device based on the determination that the candidate image includes the scene that is similar to the particular type of scene and one or more parameter values associated with the image characteristic target level for the particular type of scene to generate an optimized image corresponding to the candidate image that includes the image characteristic target level.

20. The at least one computer readable storage medium of claim 19, wherein each parameter prediction model is to include a plurality of neural network nodes having parameter values.

21. The at least one computer readable storage medium of claim 19, wherein the offline prediction analysis is conducted with respect to one or more of an exposure control brightness parameter, a tone mapping brightness parameter, a focus parameter or a white balance parameter.

22. The at least one computer readable storage medium of claim 19, wherein the training image data is to include reference images of particular types of scenes and candidate images associated with the image capture device.

23. The at least one computer readable storage medium of claim 19, wherein the instructions, when executed, cause the machine learning device to:

segment images in the training image data into a plurality of regions based on luminance intensity; and extract ground truth data from the training image data on a per-region basis, wherein the offline prediction analysis is to be conducted based at least in part on the ground truth data.

24. The at least one computer readable storage medium of claim 19, wherein the instructions, when executed, cause the machine learning device to:

identify a set of candidate features based on the training image data; and select a set of analysis features from the set of candidate features, wherein the offline prediction analysis is to be conducted based at least in part on the set of analysis features.

* * * * *